United States Patent
Schmidt et al.

(10) Patent No.: US 10,822,282 B2
(45) Date of Patent: Nov. 3, 2020

(54) METHOD OF FABRICATING A CERAMIC COMPOSITE

(71) Applicant: United Technologies Corporation, Farmington, CT (US)

(72) Inventors: Wayde R. Schmidt, Pomfret Center, CT (US); Paul Sheedy, Bolton, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 16/192,265

(22) Filed: Nov. 15, 2018

(65) Prior Publication Data
US 2020/0157011 A1    May 21, 2020

(51) Int. Cl.
C04B 35/628 (2006.01)
C04B 35/80 (2006.01)

(52) U.S. Cl.
CPC ........ C04B 35/806 (2013.01); C04B 35/6286 (2013.01); C04B 35/62842 (2013.01); C04B 35/62857 (2013.01); *C04B 2235/3813* (2013.01); *C04B 2235/3839* (2013.01); *C04B 2235/3843* (2013.01); *C04B 2235/9607* (2013.01)

(58) Field of Classification Search
CPC ............ C04B 35/806; C04B 35/62857; C04B 35/6286; C04B 35/62842; C04B 2235/3813; C04B 2235/3843; C04B 2235/3839; C04B 2235/9607
See application file for complete search history.

(56) References Cited

U.S. PATENT DOCUMENTS

| | | |
|---|---|---|
| 5,558,907 A | 9/1996 | Steffier |
| 5,682,594 A | 10/1997 | Kennedy et al. |
| 8,409,491 B1 | 4/2013 | Stackpoole et al. |
| 8,828,540 B2 | 9/2014 | Schmidt et al. |
| 9,593,049 B2 | 3/2017 | Harris et al. |
| 2004/0002418 A1 | 1/2004 | Scurlock et al. |
| 2008/0075543 A1 | 3/2008 | Zhu et al. |
| 2013/0224471 A1* | 8/2013 | Sheedy ............... C04B 41/81 428/312.6 |

FOREIGN PATENT DOCUMENTS

| | | |
|---|---|---|
| EP | 2581356 A1 | 4/2013 |
| GB | 1151464 A | 5/1969 |
| WO | WO2014069745 A1 | 5/2014 |

OTHER PUBLICATIONS

Extended European Search Report for EP Application No. 19209170.0, dated Mar. 16, 2020, 12 pages.
Extended European Search Report for EP Application No. 19209170.0, dated Jun. 25, 2020, 12 pages.

* cited by examiner

Primary Examiner — Noah S Wiese
(74) Attorney, Agent, or Firm — Kinney & Lange, P.A.

(57) ABSTRACT

A method of making a ceramic composite component includes providing a fibrous preform or a plurality of fibers, providing a first plurality of particles, coating the first plurality of particles with a coating to produce a first plurality of coated particles, delivering the first plurality of coated particles to the fibrous preform or to an outer surface of the plurality of fibers, and converting the first plurality of coated particles into refractory compounds. The first plurality of particles or the coating comprises a refractory metal.

19 Claims, 3 Drawing Sheets

METHOD OF FABRICATING A CERAMIC COMPOSITE

BACKGROUND

The present disclosure relates generally to ceramic matrix composites (CMCs) and methods of manufacturing CMCs and, more particularly to the manufacture of ultrahigh temperature CMCs.

Current CMCs and supplemental protective coatings are insufficient to provide gas turbine engine components capable of surviving increasingly aggressive turbine and hypersonic environments. There is an ongoing need to develop ultrahigh temperature materials and processes for manufacturing.

SUMMARY

In one aspect, a method of making a ceramic composite component includes providing a fibrous preform or a plurality of fibers, providing a first plurality of particles, coating the first plurality of particles with a coating to produce a first plurality of coated particles, delivering the first plurality of coated particles to the fibrous preform or to an outer surface of the plurality of fibers, and converting the first plurality of coated particles into refractory compounds. The first plurality of particles or the coating comprises a refractory metal.

In another aspect, a component for use in ultrahigh temperatures includes a ceramic matrix and a plurality of refractory compounds distributed throughout the ceramic matrix. The refractory compounds comprise a refractory metal.

The present summary is provided only by way of example, and not limitation. Other aspects of the present disclosure will be appreciated in view of the entirety of the present disclosure, including the entire text, claims and accompanying figures.

Figure 1:
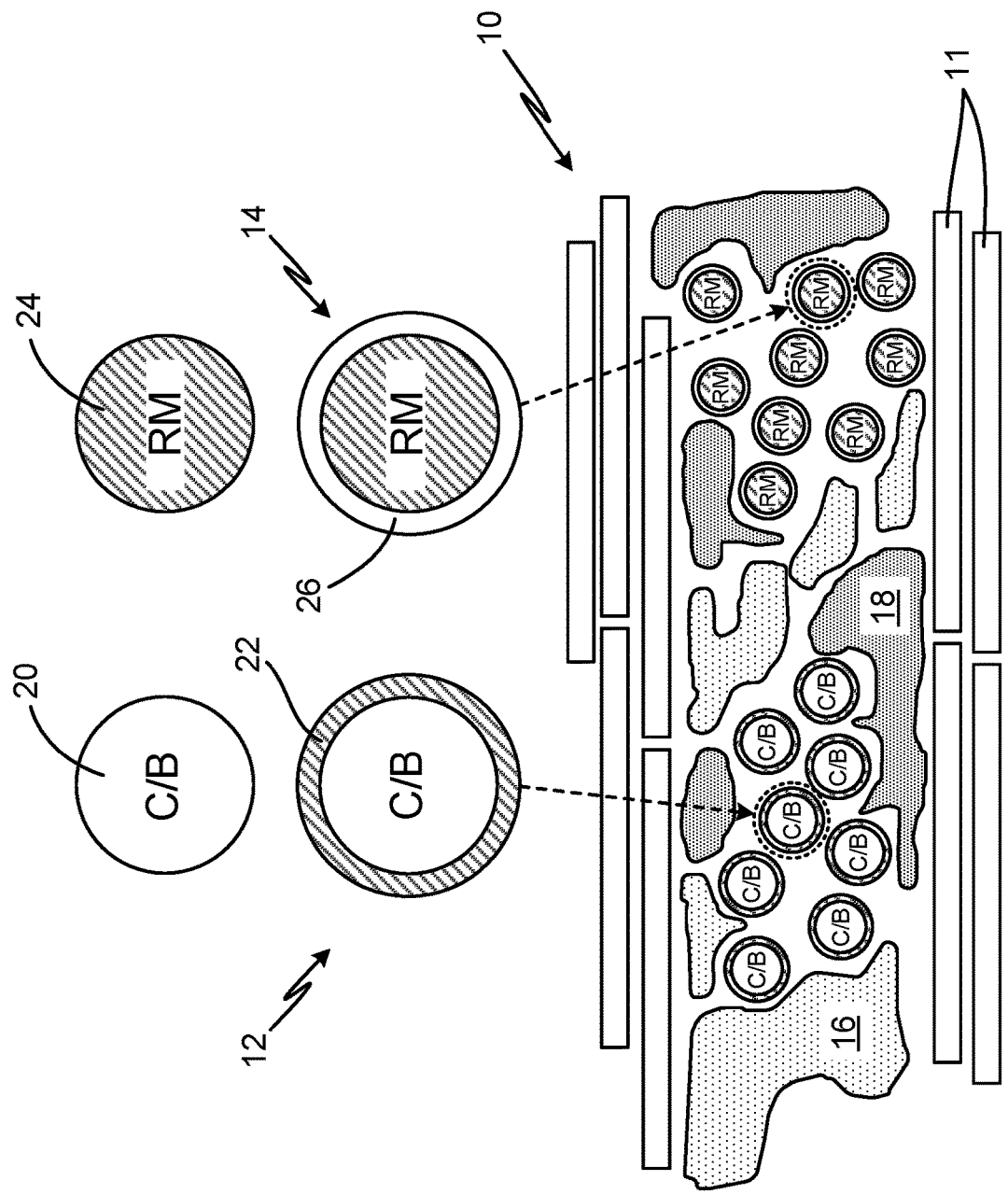
FIG. 1 is a schematic illustration of a fibrous preform infiltrated with particles that have been coated and contain both a refractory metal and carbon or boron.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Ultrahigh temperature ceramic (UHTC) compounds, including carbides or borides with a refractory metal base, can be combined with conventional silicon carbide reinforcements using relatively simple processing methods to produce ultrahigh temperature ceramic matrix composites (CMCs). As disclosed herein, particles containing a refractory metal can be delivered to a fiber preform or fiber tows using processes compatible with current CMC manufacturing methods and with high control of distribution and stoichiometry to produce CMCs with stable ultrahigh temperature refractory phases, which surpass state-of-the-art silicon carbide-based systems.

Figure 2:
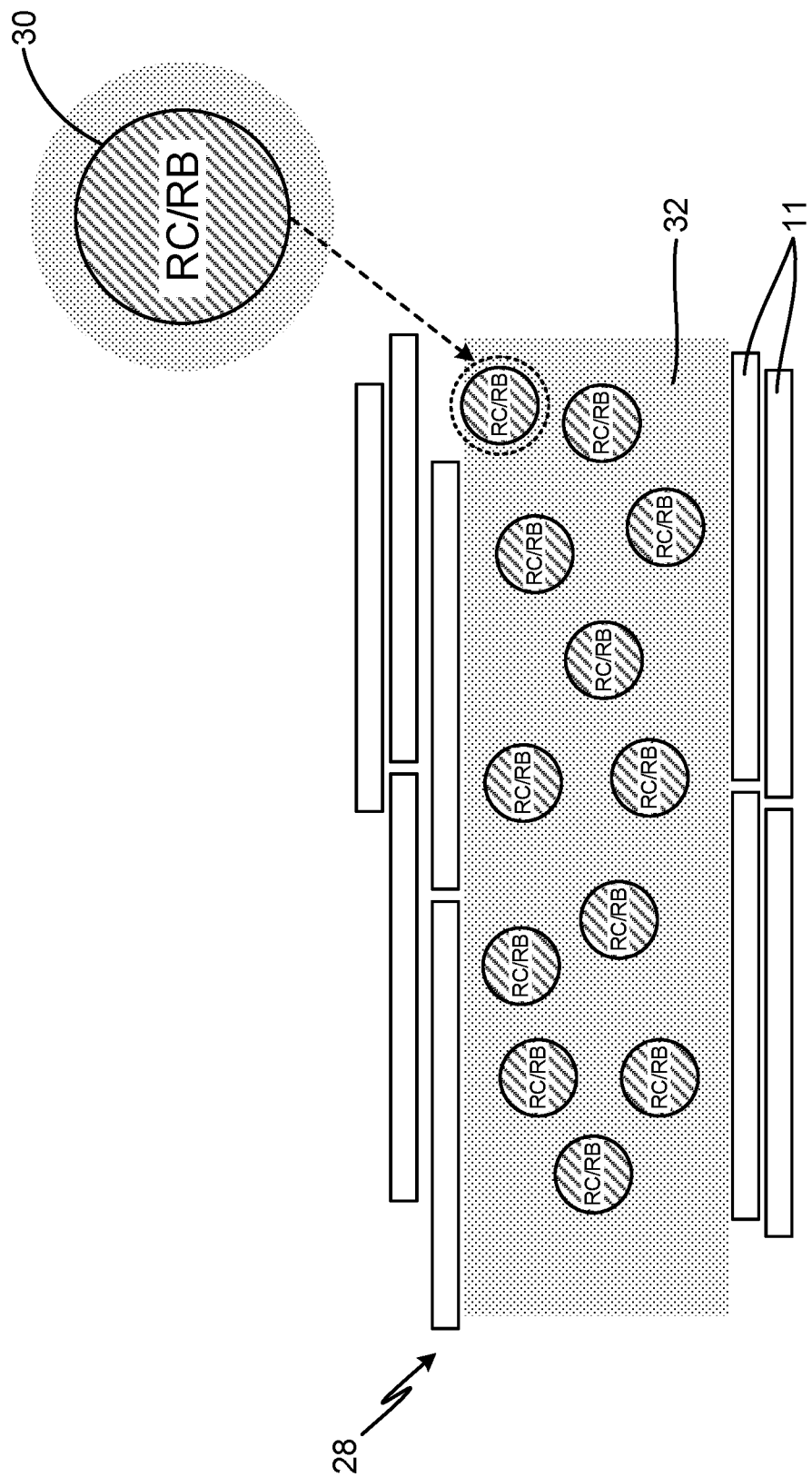
FIG. 2 is a schematic illustration of a ceramic matrix composite containing refractory compounds formed from the coated particles of FIG. 1.

FIG. 1 is a schematic illustration of a fibrous preform 10 formed by a plurality of fibers 11 and infiltrated with one or more types of coated particles 12, 14 containing both a refractory metal and carbon or boron, and two or more matrix phases 16, 18. As illustrated in FIG. 1, coated particles 12 contain a carbon- or boron-based particle 20 coated with a refractory metal coating 22. Coated particles 14 contain a refractory metal particle 24 coated with a carbon- or boron-based coating 26. FIG. 2 is a schematic illustration of a ceramic matrix composite structure 28 containing refractory compounds 30 formed from the coated particles of FIG. 1 following radiative and/or thermal treatment or treatment via other energy sources.

Carbon- and boron-based particles 20 illustrated in FIG. 1 can include spherical or irregularly-shaped powders, platelets, or chopped fibers. Carbon-based particles 20 can include, but are not limited to, graphite, diamond, or amorphous carbon particles, glassy carbon, chopped carbon fiber, carbon nanotubes, and graphene platelets. Boron-based particles 20 can similarly include various crystalline and amorphous forms. Refractory metal particles 24 can be spherical or irregularly-shaped powders. Suitable refractory metals can include tungsten, hafnium, titanium, tantalum, niobium, molybdenum, zirconium, vanadium, chromium, rhenium and mixtures thereof. Preferred refractory metals can include titanium, tantalum, niobium, zirconium, vanadium, rhenium, and hafnium.

Particles 20, 24 can be coated using any one of a number of techniques known to one of ordinary skill in the art, including vapor, plasma, and solution-based deposition methods. Atomic layer deposition (ALD) or chemical vapor deposition or infiltration (CVD/CVI) may be preferred to promote coating uniformity (e.g., ability to fully coat particles 20, 24). In alternative embodiments, coatings can be applied using slurry spraying of fine particulates onto coarser particles 20, 24, electrolytic or electroless plating, electrophoretic deposition, chemical or mechanical cladding techniques, and chemical precipitation. A fluidized bed can be used with ALD, CVD, and other techniques to promote coating uniformity and thickness control. While coating uniformity can be desirable, it is not always necessary. The ability to control stoichiometric ratios of refractory metal to carbon/boron, however, can be critical as stoichiometric ratios can determine the amount of unreacted carbon/boron and refractory metal in the final CMC component.

A coating thickness can be controlled to provide a desired ratio of the refractory metal to carbon or boron. In some embodiments, the coating thickness can be tailored to provide a stoichiometric mixture of refractory metal and carbon/boron, such that no unreacted refractory metal or carbon/boron remains upon conversion to a refractory compound (carbide or boride, respectively) with, for example, a thermal treatment. Some embodiments may benefit from a ratio of refractory metal to carbon/boron that is sub-stoichiometric (excess carbon/boron) or super-stoichiometric (excess refractory metal). Typically, refractory metals are denser than carbon and boron. There may be benefit in some applications to form a component including less dense unreacted carbon/boron protected by refractory compound outer shells. In such embodiments, a thin layer of refractory metal coating 22 can be applied to carbon/boron particles 20, such that an insufficient amount of refractory metal is available to react with the carbon/boron thereby leaving unreacted carbon/boron cores. In some embodiments, there may also be benefit to providing excess refractory metal. A thickness of refractory metal coating 22 on carbon/boron particles 20 or a thickness of carbon/boron coating 26 on refractory metal particles 24 can be tailored to provide excess refractory metal, such that more refractory metal is available than needed for reaction with the available carbon/boron particles 20 or coating 26. In some embodiments, the excess refractory metal available can react with and tie up excess carbon in one or more matrix phases 16, 18. Additionally, it may be desirable to provide excess refractory metal at or near a surface of preform 10. In this case, the available refractory metal can react with oxygen to form a desirable refractory oxide phase suitable for coating, sealing, and providing thermal barrier protection for CMCs.

In some embodiments, multiple types of coated particles 12, 14, with varying stoichiometric ratios of refractory metal to carbon/boron, can be used to form a single component and can be deposited in preform 10 to provide graded material characteristics. For example, infiltration can be graded such that an inner portion of preform 10 can contain a sub-stoichiometric ratio of refractory metal to carbon/boron to produce a component core that has unreacted carbon/boron protected by refractory compound shells, while an outer surface of preform 10 can have a super-stoichiometric ratio of refractory metal to carbon/boron to produce a refractory oxide coating on the component. Material grading can be achieved by modifying particle size and/or deposition order. For example, a natural gradient may be achieved by modifying particle size, with larger coated particles 12, 14 less likely to reach a center of preform 10 than smaller coated particles 12, 14. In other embodiments, coated particles 12, 14 of varying stoichiometric ratios of refractory metal to carbon/boron can be applied to preform 10 at different stages of infiltration to effect the material gradient. Generally, coated particles 12, 14 can range in size from under 0.1 micrometers (i.e., for carbon nanotubes) to 10 micrometers and up to 50 micrometers in some applications. Generally, smaller coated particle sizes will be needed for infiltrating preform 10. Larger coated particle sizes in excess of 50 micrometers may be used to coat fiber tows, chopped fibers, or other reinforcements being used during layup (e.g., dipping fiber tows in a slurry of coated particles 12, 14 prior to layup). Particles 20, 24 can be monomodal, bimodal or trimodal with respect to particle size distribution.

Preform 10 can be a fiber-based ceramic preform containing fibers/fiber tows 11, which can be woven, nonwoven, or selectively placed. Exemplary fiber materials include silicon carbide (SiC), carbon (C), silicon oxycarbide (SiOC), silicon nitride ($Si_3N_4$), silicon carbonitride (SiCN), Hafnium carbide (HfC), tantalum carbide (TaC), and silicon borocarbonitride (SiBCN). Coated particles 12, 14 can be delivered to preform 10 in a liquid slurry, which can be poured into preform 10 or in which preform 10 can be dipped to allow pickup of coated particles 12, 14 and the liquid. The liquid can be water or aqueous-based, or an alcohol- or solvent-based non-aqueous fluid that is chemically compatible with preform 10 and coated particles 12, 14. The liquid can be removed through a single or iterative vacuum and/or drying process prior to converting coated powders 12, 14 into refractory compounds. Alternatively, coated particles 12, 14, can be mixed with a preceramic polymer to produce a polymer slurry, which can be delivered to preform 10. The preceramic polymer can be retained in preform 10 and converted to a ceramic matrix phase or phases 16, 18 after thermal processing in a manner consistent with polymer infiltration and pyrolysis (PIP) techniques. The polymer slurry can be delivered to preform 10 in a manner similar to the aforementioned liquid slurry or can be injected into preform 10. Generally, the preceramic polymer has a low viscosity to allow for infiltration into preform 10, but high enough viscosity to help lock coated particles 12, 14 into preform 10. The infiltration process can be conducted at normal pressure or can be vacuum- or pressure-assisted. Both liquid slurry and polymer slurry infiltration processes can be conducted multiple times to achieve a desired amount and distribution of coated particles 12, 14 in preform 10. Preform 10 is preferably infiltrated with sufficient coated particles 12, 14 to produce a composite structure 28 (shown in FIG. 2) in which refractory compounds 30 range from approximately 12 to 80 percent by volume of matrix 32 upon conversion and processing. Fibers 11 can typically make up 20 to 60 percent by volume of composite structure 28, while other matrix phases can make up the remaining volume.

In some embodiments, both liquid and polymer slurries can be used to deliver coated particles 12, 14 to preform 10. For example, a more viscous polymer slurry can be delivered to preform 10 followed by a less viscous liquid slurry to fill remaining gaps. The concentration of coated particles 12, 14 in liquid and polymer slurries can be selected to provide the desired refractory compound volume in composite structure 28, while providing a fluid capable of infiltrating preform 10 (e.g., having a sufficiently low viscosity). The use of liquid and polymer slurries to deliver coated particles 12, 14 to preform 10 is compatible with other infiltration manufacturing steps, including PIP, melt infiltration (MI), and hybrid processes (combination of CVI/PIP, CVI/MI, or PIP/MI). Delivery of coated particles 12, 14 in liquid and/or polymer slurries can provide for controlled distribution of refractory compounds 30 and refractory based phases thereby enhancing matrix thermal and physical properties.

In some embodiments, a preceramic polymer slurry containing coated particles 12, 14 can be used to lay up fibers or fiber tows 11 in preform 10. Fiber tows 11 can be immersed in the polymer slurry to coat fiber tows 11 prior to layup and thereby allow placement of coated particles 12, 14 in preform 10 as preform 10 is being built. The binding action of the polymer can be used to form the preform 10. The polymer slurry can also be used in a similar manner for ply layups, in which each ply is coated and/or infiltrated prior to layup. The preceramic polymer can be a silicon-based or carbon-based preceramic polymer as known in the art.

Additional preceramic polymers can be delivered to preform 10 to produce matrix phases 16, 18. Matrix phases 16, 18 can be a preceramic silicon carbide (SiC), glass, oxide, or silicon oxycarbide, and the like. Both the type of coated particles 12, 14 and type of matrix phases 16, 18 can be selected based on the application to accommodate different thermal and environmental requirements of different sections of a gas turbine engine. In some embodiments, preform 10 can be infiltrated with both coated particles 12 and 14, including both carbon and boron, and with multiple refractory metals.

Thermal, radiative, or other forms of energy can be applied to preform 10 following delivery of coated particles 12, 14 to convert coated particles to refractory compounds 30 and to convert preceramic polymers forming matrix phases 16, 18 into ceramic matrix 32. FIG. 2 is a schematic illustration of CMC structure 28 containing refractory compounds 30 (i.e., refractory carbides and/or refractory borides) formed from the conversion of coated particles 12, 14. Both refractory carbide and refractory boride, formed in accordance with the present disclosure (i.e., having a refractory metal base), provide a more stable high temperature phase in a composite structure than silicon carbide. Thermal and radiative exposure for conversion of coated particles 12, 14 can be provided by energy sources known in the art, including, but not limited to, a furnace or oven, microwave exposure, plasma, applied electric fields, and the like. Depending on the stoichiometric ratio of refractory metal to carbon/boron in each of the plurality of coated particles 12, 14, excess refractory metal and/or carbon/boron may be present. In some embodiments, excess refractory metal can react with ceramic precursors or other materials, tying up excess carbon present in matrix phases 16, 18. The terms "ceramic precursors" and "preceramic polymers" are used interchangeably herein. Although refractory compounds 30 are illustrated as being separated from one another within matrix 32, refractory compounds can be connected or distributed in any manner selected to provide an enhanced microstructure and enhanced thermal properties. Additional heat treatment, infiltrations of coated particles 12, 14 and/or preceramic polymers, vapor phase densification (i.e., CVD/CVI), spark plasma sintering, hot pressing, machining, and other processes can be performed to provide a final desired component.

Figure 3:
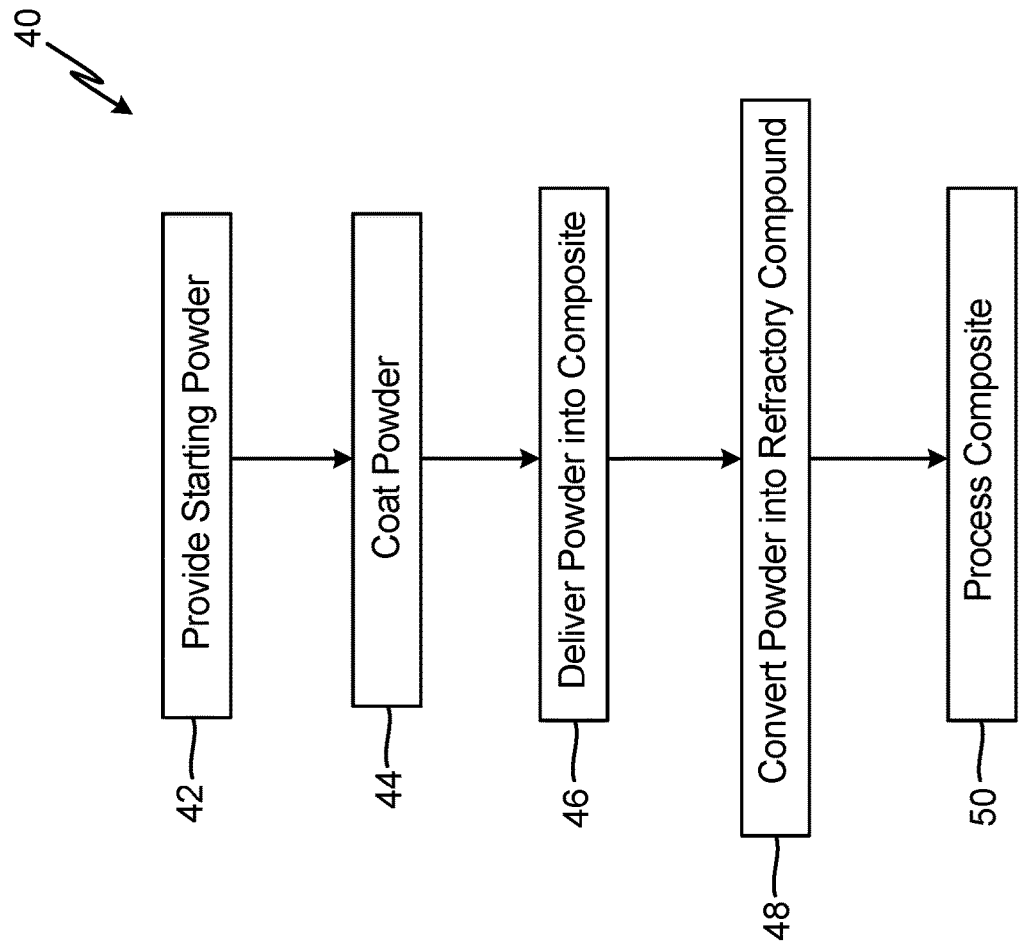
FIG. 3 is a flow chart of a method for manufacturing a ceramic composite matrix component containing refractory compounds.

FIG. 3 is a flow chart of method 40 for manufacturing a CMC component containing refractory compounds according to the present disclosure. As previously discussed, method 40 is compatible with PIP, MI, and hybrid CVI/PIP, CVI/MI, or PIP/MI CMC manufacturing processes currently used to produce CMCs. Carbon-based, boron-based, and/or refractory metal particles are provided in step 42. The particle material, size, and geometry can be selected based on the application and numerous particle materials, sizes, and geometries can used to form a single CMC component. Particles are coated in step 44. Carbon-based and boron-based particles 20 are coated with a refractory metal coating 22 to produce coated particles 12; refractory metal particles 24 are coated with carbon-based or boron-based coatings 26 to produce coated particles 14 (shown in FIG. 1). Coatings 22, 26 can be applied by any number of methods known in the art, including but not limited to, vapor phase deposition, plasma deposition, solution-based methods, mechanical alloying, electrolytic or electroless plating, electrophoretic depositions, mechanical or chemical cladding processes, and the like. A fluidized bed can be used in combination with some coating processes to provide more uniform coating on particles 20, 24. The thickness of coatings 22, 26 can be tailored to provide the desired stoichiometric ratio of refractory metal to carbon/boron and can be varied (e.g., coated particles 12, 14 having varying stoichiometric ratios can be provided for infiltration into preform 10). Coated particles 12, 14 can be delivered to preform 10 in step 46. Coated particles 12, 14 can be mixed with an aqueous or non-aqueous liquid or a preceramic polymer to produce a liquid or polymer slurry, which can be poured or injected into preform 10 or in which preform 10 can be dipped. In alternative embodiments, fibers or fiber tows 11 can be immersed in the polymer slurry prior to layup to provide further control of the distribution of coated particles 12, 14 in the building of preform 10. As previously discussed, natural material grading formed by variations in coated particles 12, 14 can occur during infiltration step 46 based on variations in particle size. Additional material grading can be produced by varying particle material during the infiltration process. In addition to the polymer slurry, other preceramic polymers can be delivered to preform 10 to form matrix phases 16, 18. In some embodiments, coated particles 12, 14 can be mixed with preceramic polymers and delivered to preform 10 simultaneously. In other embodiments, the delivery of coated particles 12, 14 and preceramic polymers can be conducted as separate discrete steps. Step 46 can be repeated as necessary to provide the desired coated particle and matrix phase volumes in preform 10. Following infiltration, preform 10 can be exposed to thermal or radiative energy to convert coated particles 12, 14 and preceramic polymers forming matrix phases 16, 18 to refractory compounds 30 and ceramic matrix 32, respectively (step 48). In step 50, additional heat treatment, infiltrations of coated particles 12, 14 and/or preceramic polymers, vapor phase densification (i.e., CVD/CVI), ALD, spark plasma sintering, hot pressing, machining, and other processes can be performed to provide a final desired component.

Refractory phases that include carbides and borides with a refractory metal base can be combined with conventional silicon carbide reinforcements using highly flexible processing methods compatible with those currently used for CMC manufacture to produce ultrahigh temperature CMCs. Coated particles that can be converted into refractory compounds with heat or radiative treatment can be delivered to a preform or fiber tows, chopped fibers, or other reinforcement structures in the layup process with high control of distribution, while coating thickness on particles can be controlled to provide a desired stoichiometry. The ability to control stoichiometry and distribution of refractory compounds enables the manufacture of ultrahigh temperature CMCs with enhanced matrix thermal and physical properties.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A method of making a ceramic composite component according to an exemplary embodiment of this disclosure, among other possible things includes providing a fibrous preform or a plurality of fibers, providing a first plurality of particles, coating the first plurality of particles with a coating to produce a first plurality of coated particles, delivering the first plurality of coated particles to the fibrous preform or to an outer surface of the plurality of fibers, and converting the first plurality of coated particles into refractory compounds. The first plurality of particles or the coating comprises a refractory metal.

The method of the preceding paragraph can optionally include, additionally and/or alternatively, any one or more of the following features, configurations, additional components, and/or steps:

A further embodiment of the foregoing method, wherein the first plurality of coated particles can be mixed with a preceramic polymer for delivery to the preform or fibers.

A further embodiment of any of the foregoing methods can further include processing the preceramic polymer and refractory compounds to produce a ceramic matrix composite containing the refractory compounds.

A further embodiment of any of the foregoing methods, wherein converting the first plurality of coated particles into refractory compounds can include applying radiative or thermal energy to the first plurality of coated particles A further embodiment of any of the foregoing methods, wherein the first plurality of particles can be selected from a group consisting of powder, platelets, and chopped fibers.

A further embodiment of any of the foregoing methods, wherein the coating can comprise the refractory metal and the first plurality of particles can comprise a material selected from the group consisting of carbon and boron.

A further embodiment of any of the foregoing methods, wherein a first subset of the first plurality of coated particles can comprise a stoichiometric ratio of the material forming the first plurality of particles and the refractory metal.

A further embodiment of any of the foregoing methods, wherein a second subset of the first plurality of coated particles can comprise an excess amount of the carbon or boron than needed for a stoichiometric mixture with the refractory metal such that the resulting refractory compounds form around carbon or boron cores.

A further embodiment of any of the foregoing methods, wherein a third subset of the first plurality of coated particles can comprise an excess amount of the refractory metal than needed for a stoichiometric reaction with the carbon or boron.

A further embodiment of any of the foregoing methods can further include a first subset of the first plurality of coated particles, wherein coated particles of the first subset comprise a stoichiometric ratio of the material forming the first plurality of particles and the refractory metal; a second subset of the first plurality of coated particles, wherein coated particles of the second subset comprise an excess amount of the carbon or boron than needed for a stoichiometric mixture with the refractory metal such that the resulting refractory compounds form around carbon or boron cores; and a third subset of the first plurality of coated particles, wherein coated particles of the third subset comprise an excess amount of the refractory metal than needed for a stoichiometric reaction with the carbon or boron.

A further embodiment of any of the foregoing methods, wherein the refractory metal can be selected from the group consisting of hafnium, titanium, tantalum, niobium, zirconium, vanadium, rhenium, and mixtures thereof.

A further embodiment of any of the foregoing methods, wherein the first plurality of coated particles can form a portion of a matrix and wherein the matrix contains 12 to 80 percent of the first plurality of coated particles by volume.

A further embodiment of any of the foregoing methods can further include densifying the fibrous preform to form a composite structure, and processing the composite structure to produce a final form of the component.

A component for use in ultrahigh temperatures according to an exemplary embodiment of this disclosure, among other possible things, includes a ceramic matrix and a plurality of refractory compounds distributed throughout the ceramic matrix. The refractory compounds comprise a refractory metal.

The component of the preceding paragraph can optionally include, additionally and/or alternatively, any one or more of the following features, configurations, and/or additional elements:

A further embodiment of the foregoing component, wherein the plurality of refractory compounds can comprise refractory carbides or refractory borides.

A further embodiment of any of the foregoing components, wherein the plurality of refractory compounds can comprise refractory carbides or refractory borides containing unreacted carbon or boron cores, respectively.

A further embodiment of any of the foregoing components can further include a plurality of refractory oxides distributed on a surface of the component, wherein the refractory oxides comprise a refractory metal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a ceramic composite component, the method comprising:
   providing a fibrous preform or a plurality of fibers;
   providing a first plurality of particles;
   coating the first plurality of particles with a coating to produce a first plurality of coated particles, wherein the first plurality of particles or the coating comprises a refractory metal;
   delivering the first plurality of coated particles to the fibrous preform or to an outer surface of the plurality of fibers;
   wherein the first plurality of coated particles forms a portion of a matrix and wherein the matrix contains 12 to 80 percent of the first plurality of coated particles by volume; and
   converting the first plurality of coated particles into refractory compounds.

2. The method of claim 1, wherein the first plurality of coated particles is mixed with a preceramic polymer for delivery to the preform or fibers.

3. The method of claim 2 and further comprising processing the preceramic polymer and refractory compounds to produce a ceramic matrix composite containing the refractory compounds.

4. The method of claim 1, wherein converting the first plurality of coated particles into refractory compounds comprises applying radiative or thermal energy to the first plurality of coated particles.

5. The method of claim 1, wherein the first plurality of particles are selected from a group consisting of powder, platelets, and chopped fibers.

6. The method of claim 5, wherein the coating comprises the refractory metal and the first plurality of particles comprise a material selected from the group consisting of carbon and boron.

7. The method of claim 6, wherein for a first subset of the first plurality of coated particles, each coated particle comprises a stoichiometric ratio of the material forming the first plurality of particles and the refractory metal.

8. The method of claim 6, wherein for a second subset of the first plurality of coated particles, each coated particle comprises an excess amount of the carbon or boron than needed for a stoichiometric mixture with the refractory metal such that the resulting refractory compounds form around carbon or boron cores.

9. The method of claim 6, wherein for a third subset of the first plurality of coated particles, each coated particle comprises an excess amount of the refractory metal than needed for a stoichiometric reaction with the carbon or boron.

10. The method of claim 9, wherein the first subset of the first plurality of coated particles is delivered to an outer surface of the fibrous preform.

11. The method of claim 6, wherein the first plurality of coated particles comprises:
a first subset of the first plurality of coated particles, wherein each coated particle of the first subset comprises a stoichiometric ratio of the material forming the first plurality of particles and the refractory metal;
a second subset of the first plurality of coated particles, wherein each coated particle of the second subset comprises an excess amount of the carbon or boron than needed for a stoichiometric mixture with the refractory metal such that the resulting refractory compounds form around carbon or boron cores; and
a third subset of the first plurality of coated particles, wherein each coated particle of the third subset comprises an excess amount of the refractory metal than needed for a stoichiometric reaction with the carbon or boron.

12. The method of claim 1, wherein the first plurality of particles comprise the refractory metal and the coating comprises a material selected from the group consisting of carbon and boron.

13. The method of claim 12 and further comprising:
providing a second plurality particles comprising a material selected from the group consisting of carbon and boron;
coating the second plurality of particles with a refractory metal to produce a second plurality of coated particles; and
converting the second plurality of coated particles into refractory compounds.

14. The method of claim 1, wherein the refractory metal is selected from the group consisting of hafnium, titanium, tantalum, niobium, zirconium, vanadium, rhenium, and mixtures thereof.

15. The method of claim 1 and further comprising:
densifying the fibrous preform to form a composite structure; and
processing the composite structure to produce a final form of the component.

16. A component for use in ultra-high temperatures, the component comprising:
a ceramic matrix;
a plurality of refractory compounds distributed throughout the ceramic matrix, wherein the plurality of refractory compounds comprises refractory carbides or refractory borides comprising a refractory metal and containing unreacted carbon or boron cores, respectively.

17. The component of claim 16 and further comprising a plurality of refractory oxides distributed on a surface of the component, wherein the refractory oxides comprise a refractory metal.

18. A method of making a ceramic composite component, the method comprising:
providing a fibrous preform or a plurality of fibers;
providing a first plurality of particles comprising a refractory metal;
coating the first plurality of particles with a coating comprising a material selected from the group consisting of carbon and boron to produce a first plurality of coated particles;
delivering the first plurality of coated particles to the fibrous preform or to an outer surface of the plurality of fibers; and
converting the first plurality of coated particles into refractory compounds.

19. The method of claim 17 and further comprising:
providing a second plurality particles comprising a material selected from the group consisting of carbon and boron;
coating the second plurality of particles with a refractory metal to produce a second plurality of coated particles; and
converting the second plurality of coated particles into refractory compounds.

* * * * *